Figure 1:
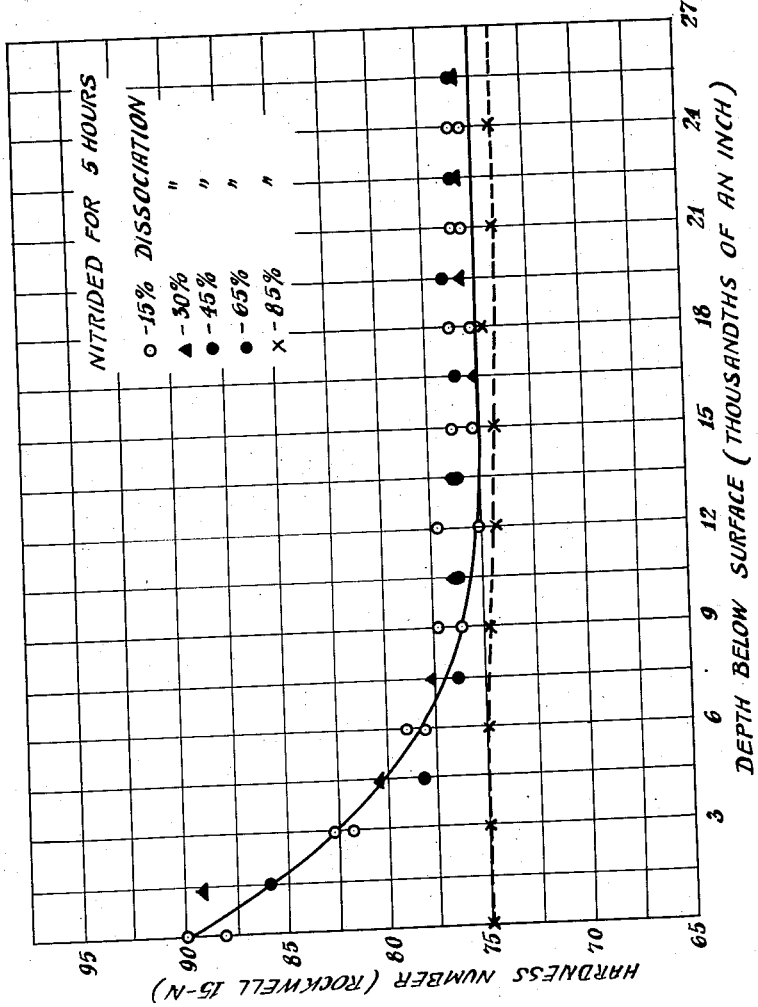

March 9, 1948.  C. F. FLOE  2,437,249
METHOD OF NITRIDING
Filed April 17, 1946  7 Sheets-Sheet 1

INVENTOR.
Carl F. Floe
BY
Hoguet, Neary & Campbell
ATTORNEYS

March 9, 1948.   C. F. FLOE   2,437,249
METHOD OF NITRIDING
Filed April 17, 1946   7 Sheets-Sheet 4

ROCKWELL 15N HARDNESS CHARACTERISTICS OF SAMPLES NITRIDED FOR 100 HOURS AT THE DISSOCIATION OF AMMONIA SHOWN.

INVENTOR.
Carl F. Floe
BY
Hoguet, Mearys, Campbell
ATTORNEYS

March 9, 1948.  C. F. FLOE  2,437,249
METHOD OF NITRIDING
Filed April 17, 1946  7 Sheets-Sheet 5

15%

30%

45%

65%

TYPICAL CASE STRUCTURES PRODUCED BY NITRIDING FOR
5 HOURS AT THE AMMONIA DISSOCIATIONS SHOWN.

INVENTOR.
Carl F. Floe
BY Huguet, Neary & Campbell
ATTORNEYS

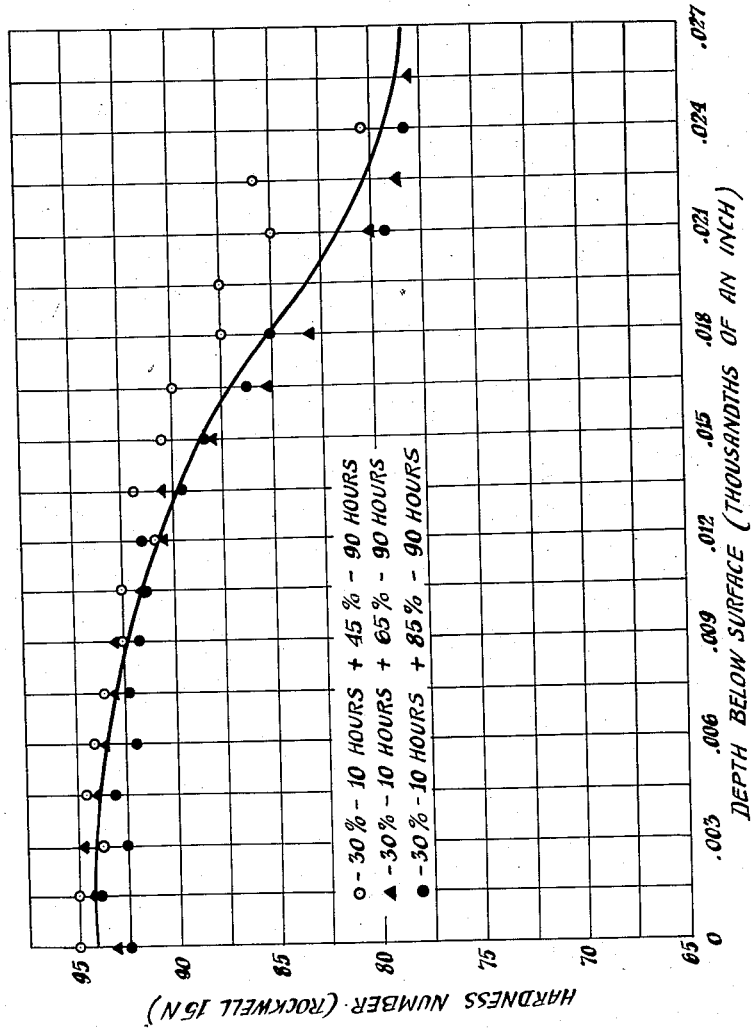

March 9, 1948.  C. F. FLOE  2,437,249
METHOD OF NITRIDING
Filed April 17, 1946  7 Sheets-Sheet 7

Fig. 10

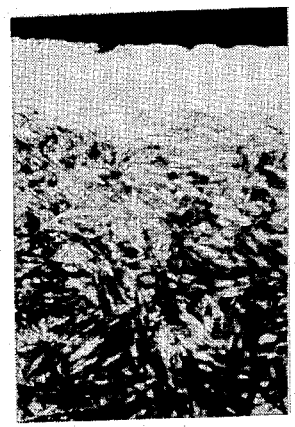

10 HOURS AT 30% DISSOCIATION
90 HOURS AT 45% DISSOCIATION

Fig. 11

10 HOURS AT 30% DISSOCIATION
90 HOURS AT 65% DISSOCIATION

Fig. 12

10 HOURS AT 30% DISSOCIATION
90 HOURS AT 85% DISSOCIATION

STRUCTURE OF CASE PRODUCED BY FIRST NITRIDING SAMPLE FOR
10 HOURS AT 30% DISSOCIATION, FOLLOWED BY NITRIDING FOR
90 HOURS AT 45%, 65% AND 85% DISSOCIATION RESPECTIVELY.

INVENTOR.
Carl F. Floe
BY
August, Meary & Campbell
ATTORNEYS

Patented Mar. 9, 1948

UNITED STATES PATENT OFFICE 2,437,249

METHOD OF NITRIDING

Carl F. Floe, Belmont, Mass., assignor to The Nitralloy Corporation, a corporation of Delaware Application April 17, 1946, Serial No. 662,686

11 Claims. (Cl. 148—16.6)

This invention relates to an improvement in the surface hardening of ferrous metals by nitriding, and more particularly to an improved method of nitriding with the use of ammonia gas as the nitriding agent.

The nitriding process, in general, as applied in commercial practice to the surface hardening of steel comprises heating steels of special composition in contact with ammonia gas, usually at temperatures between 925° F. and 975° F., for periods which vary from ten to one hundred hours depending upon the depth of case desired. During this period nitrogen, liberated by decomposition of the ammonia, is absorbed by and forms nitrides with the iron and with the special alloying elements present in the steel, usually aluminum, chromium and molybdenum and sometimes including nickel, vanadium or other nitride-hardening elements. The nitrides of the special elements are precipitated at the nitriding temperature along the crystal planes of the iron, which results in the production of an extremely hard and wear resistant case.

In general, the nitride case formed in nitriding is made up of two more or less separate and distinct zones. The first of these, or outer zone, represents the region in which all nitride-forming elements, including iron, have been converted to nitrides. This zone is frequently called the "white layer" since it appears white under the microscope after a nital etch. The second zone beneath the white layer represents the region in which most of the special elements, but not the iron, have been converted to nitrides.

The outer zone, or white layer, is very brittle and is therefore usually removed by grinding before a nitride case is put into service. While under normal nitriding conditions, as nitriding has heretofore been conducted, this outer zone is relatively thin as compared with the second zone, usually not constituting more than one-tenth of the total thickness of the case, nevertheless its formation and subsequent removal by grinding represent a substantial item of the cost of producing the finished nitrided product. At the same time it has been generally accepted that the formation of the white layer is unavoidable if a satisfactory nitriding result is to be attained. This view has been predicated on the observation that if the white layer is not formed the resulting case will be shallow and will possess unsatisfactory depth-hardness characteristics.

As I shall point out hereinafter, my investigations confirm the experience of the prior workers, but show how the thickness of the white layer may be controlled and that it may be practically eliminated toward or at the end of the nitriding operation without adversely affecting the result. I have also found that a much better nitrided case structure is assured when the nitriding operation is so controlled that only a relatively thin white layer is present at the end of the nitriding operation.

Another factor entering largely into the cost of nitriding is the ammonia consumption. As the nitriding process has been heretofore conducted commercially, it has been wasteful of ammonia gas in that only a small part of the ammonia circulated through the nitriding container is dissociated into its constituents nitrogen and hydrogen. The basis for this prior practice will become apparent from the ensuing discussion.

When ammonia is heated to a nitriding temperature range, very little dissociation occurs except at surfaces capable of catalyzing its decomposition. Steel, as well as other ferrous metals, has such a surface and therefore during nitriding the following reaction occurs at the gas-solid interface:

$$NH_3 = N + 3H$$

It is assumed that the atomic hydrogen thus formed passes immediately to the molecular state. A part of the atomic nitrogen is absorbed by the steel and the balance reacts to form $N_2$ which is inert. Since the life of the atomic nitrogen is short, it is necessary to replenish it by continuously supplying fresh ammonia to the steel surfaces. Thus in nitriding it becomes very important to circulate the ammonia in such a way as to constantly re-supply the active nitrogen on all areas to be hardened.

In order to assure a sufficient supply of active nitrogen, it is the usual practice to so regulate the flow of ammonia through the nitriding container as to maintain a concentration of 70% $NH_3$ and 30% $N_2$ plus $H_2$ in the exhaust gas. This is commonly spoken of as maintaining the ammonia dissociation at 30%. Actually, due to the change in volume involved, only 17.7% of the ammonia entering the container is dissociated under these conditions. The balance,  or 82.3%, simply circulates through the retort and is wasted. Of the amount which is dissociated, only a very small fraction provides nitrogen which is absorbed by the steel.

It was not regarded practical to carry on the nitriding with a high percentage dissociation of ammonia and had been observed that if the ammonia were completely dissociated either no substantial hardening would take place or the resulting nitride case would be very shallow and unsatisfactory from the depth-hardness standpoint.

It is one of the outstanding objects of the invention to bring about a marked saving in the ammonia consumed in nitriding.

It is a further and important object of the present invention to minimize the amount of the white layer with consequent improvement in the hardened case and elimination or marked reduction of the amount of grinding required to bring the product to the desired finished state.

These and other objects that will be brought out hereinafter may be attained according to my invention by regulation of the extent of the dissociation of the ammonia gas brought into contact with the nitridable steel or other ferrous metal being nitrided, and by varying such dissociation according to a procedure more fully hereinafter described.

I have found that there is very little difference in depth-hardness characteristics obtained by using ammonia dissociations of between 15% and 65% (percentage dissociation being computed as referred to above) either during the initial stages of nitriding only or throughout the nitriding cycle, but that when somewhat higher dissociations are employed in the initial stages, such as above 75% to about 85% when the nitriding is conducted within the range 925° F. to 975° F., the hardened case is distinctly more shallow, indicating that at such dissociations initiation of the nitriding reactions is delayed or that they proceed more slowly.

My investigations also show that the tendency to form the white layer decreases with increasing dissociation although a thin white layer is formed even in five hours at 65% dissociation. At 85% and above no appreciable white layer is produced regardless of the nitriding time, and at dissociations of about 90% and upwards, depending somewhat upon the nitriding temperature, objectionable denitriding will take place. I have also found that the total depth of nitrided case produced is largely independent of the ammonia dissociation at all dissociations up to about or somewhat above 65%.

I believe the reason that the total depth of nitrided case produced is largely independent of the ammonia dissociation up to above 65% to be that up to this percentage a thin white layer (largely iron nitrides and probably principally $Fe_2N$ and $Fe_4N$) is formed on the surface of the steel very soon after nitriding is started. Once a white layer is formed, the depth of nitrided case produced becomes only a function of the rate of diffusion of nitrogen from this layer into the steel beneath. The depth of case beneath the white layer therefore becomes independent of the gas composition, the only condition being that there must be sufficient undissociated ammonia present in the gaseous atmosphere to prevent the decomposition of the iron nitrides. The only effect of increasing the flow of ammonia (i. e., decreasing the dissociation) beyond this point is to incerase the depth of white layer.

I have found, however, that when nitriding is begun under conditions that insure formation of the white layer and a continuous white layer has been formed, the process can be continued at higher dissociations and that nitrogen will continue to be absorbed by the steel at dissociations even as high as about 85% with entirely satisfactory results.

From the results of my tests which are referred to in further detail hereinafter, it also appears that once the white layer has been formed its depth may be controlled without substantially affecting the rate of nitriding by varying the ammonia dissociation throughout the range from practically zero dissociation up to about 85%. I have found further that the thickness of the white layer tends to reach a definite value for each ammonia dissociation value provided the ammonia dissociation is maintained constant for a sufficient period of time to permit a state of equilibrium or balance to be established between the nitrides of the white layer and the furnace atmosphere on the one hand and between the nitrides of the white layer and the underlying normal nitride case on the other.

Based on my studies of the importance of the white layer and the influence of the ammonia dissociation on the thickness of the white layer, I shall now describe several ways in which these principles may be employed in commercial nitriding operations to realize both the advantage of substantially compete elimination of the white layer and marked economies in ammonia consumption.

According to one method of applying the principles of the invention the nitriding process may be conducted in two main steps, in the first of which the ammonia dissociation is so controlled as to insure rapid formation of a continuous white layer on the surfaces of the steel or other ferrous alloy undergoing nitriding. In the second step the ammonia dissociation is increased to a relatively high value within the range where there is little tendency for formation of the white layer but below the dissociation value at which denitriding will take place. The nitriding treatment is then continued under such changed conditions until sufficient nitrogen has been absorbed by the metal to insure the desired ultimate depth of case. The first step may be carried out at dissociations of from 15% to 65% but about 30% to 45% is preferred because at this dissociation a white layer of substantial thickness is quickly formed. The dissociation may then be raised as high as 75% or even to 85% if carefully controlled and uniform circulation is maintained. If the ammonia dissociation is maintained at or just below 85%, either throughout the second step of the nitriding treatment or for a sufficient period during the later stages of the treatment, the excess nitrogen present in the white layer as iron nitrides will diffuse substantially completely inwardly into the case leaving practically no white layer. Elimination of the white layer is a particular advantage in cases where it would otherwise have to be removed. Furthermore, regardless of whether or not the dissociation is raised during the later stages of nitriding to the point where the white layer has practically disappeared, a much better case structure is assured by controlling the nitriding so that only a relatively thin white layer is present upon completion of the treatment.

When finishing the nitriding treatment with a relatively high ammonia dissociation and in this way removing a previously formed white layer by diffusion of the iron nitrides inwardly into the case, care should be taken to avoid raising the dissociation to the point where a pronounced denitriding action will be produced. If this occurs cracks will develop in the surface portions of the case. This is to be avoided. The ammonia dissociation at which denitriding will become noticeable will vary somewhat depending on the nitriding temperature and the presence or absence of gaseous diluents other than the ammonia dissociation products nitrogen and hydrogen. The important thing is to provide a gaseous atmosphere in which the partial pressure exerted by the undissociated ammonia is sufficient to prevent dissociation of the iron nitrides present in the surface portions of the white layer with consequent loss of their contained nitrogen to the furnace atmosphere. As previously noted, when using an ammonia atmosphere containing no added diluents and operating within the temperature range of 925° F.–975° F., the denitriding action does not become objectionable until the dissociation is raised to above 90%. In the range from about 85% to 90% dissociation the action upon a previously nitrided case appears primarily one of promoting diffusion of the excess nitrides of the white layer, if present, inwardly into the steel or other nitridable ferrous metal under treatment. In this way, it is possible to increase the useful depth of case even after the ammonia dissociation has been increased to the point where there is no further tendency for the nitrogen to be taken up by the ferrous metal. In the specific embodiments of my invention disclosed herein such diffusion action will continue to take place during the interval after the ammonia dissociation value has been increased to around or above 85%.

This phenomenon of controlled diffusion of nitrogen from a previously formed white layer may be usefully employed in other ways than those specifically disclosed herein while at the same time bringing about similar marked economies in ammonia consumption and producing nitrided products that have little or no white layer as they are taken from the nitriding furnace.

By way of a specific example of a commercial embodiment of the invention, the metal may first be nitrided for say 10 hours at about 30% dissociation and then nitrided for say 90 hours within the range 45% to 85% dissociation while either gradually or from time to time raising the dissociation until the dissociation approaches the upper limit. The higher dissociation, of course, is most economical of ammonia but requires more care in circulation and control to prevent dead zones in which the dissociation becomes unduly high and would lead to denitriding.

According to another specific example, the metal may first be nitrided at an ammonia dissociation of from 15% to 65% for an initial period sufficient to insure the formation of a continuous white layer, usually for a period of from 5 to 10 hours, whereupon the ammonia dissociation is then increased to about 65–75% and held in this range for from 10 to 90 hours depending upon the desired ultimate thickness of the case. By thereafter raising the ammonia dissociation value to at least 85% but at the same time keeping it below the point at which objectionable denitriding will take place and continuing heating at the nitriding temperature for a sufficient further period, the thin white layer present at the conclusion of the previous stage of the nitriding will be eliminated by diffusion of the excess nitrides of such white layer into the inner portions of the case.

It is evident that mechanical means of circulation of the gas within the retort will provide more uniform nitriding conditions over all surfaces than will be obtained by simply allowing the ammonia to enter the container at the bottom and be exhausted at the top. A furnace which will allow nitriding to be carried out at high dissociations of ammonia must necessarily be designed in such a way as to provide a system of gas circulation that prevents any great difference in the degree of dissociation in different parts of the retort.

It is a well known fact that the rate of ammonia dissociation increases with time during a given nitriding cycle. The reason for this appears to be that the white layer is capable of breaking down the ammonia at a more rapid rate than the original steel surfaces. This means that it is necessary to increase the rate of flow of ammonia during a nitriding cycle if the dissociation is to be maintained at 30%. However, in accordance with the present process, if nitriding is started at 30% dissociation, this percentage may be allowed to increase with time without danger of producing inferior cases.

The following table indicates the amount of ammonia wasted at different dissociations and illustrates the great saving to be effected by raising the rate to as near 85% as practicable:

| Percent. Dissociation of Ammonia | Percent. Ammonia Wasted |
|---|---|
| 15 | 91.9 |
| 30 | 82.3 |
| 45 | 71.0 |
| 65 | 51.9 |
| 85 | 26.1 |

In other words, in operating at 30% dissociation, approximately 17.7% of the ammonia is actually dissociated. At 65%, 48.1% is dissociated. This means that approximately three times as much ammonia may be utilized at 65% as at 30%.

Figure 2:
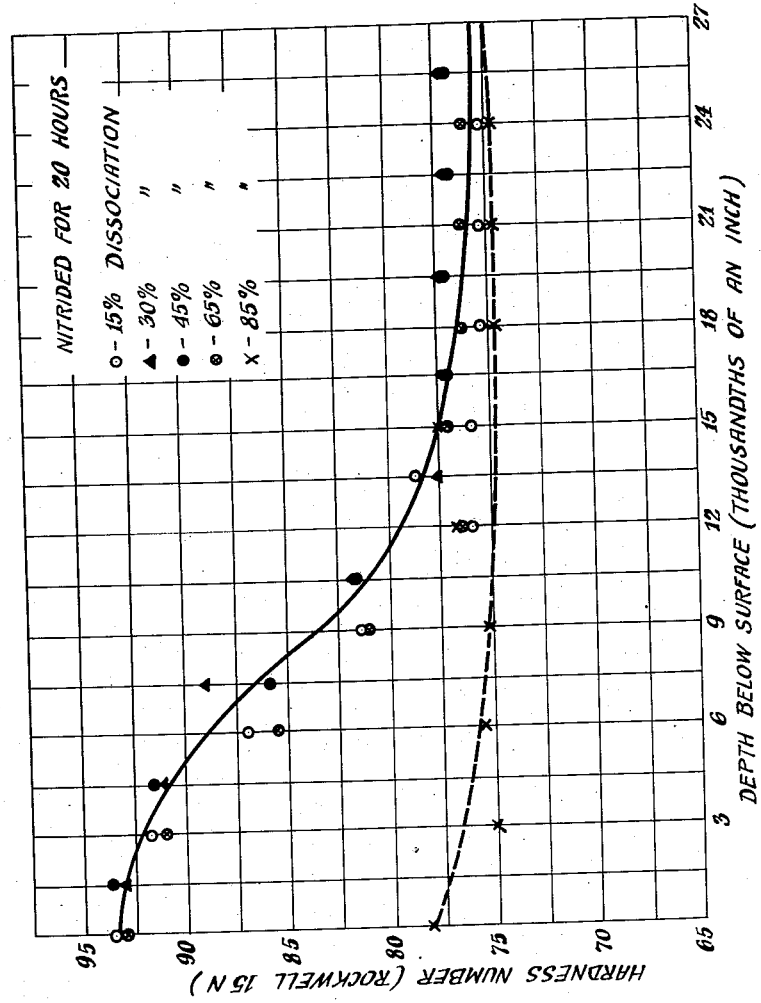
Figure 3:
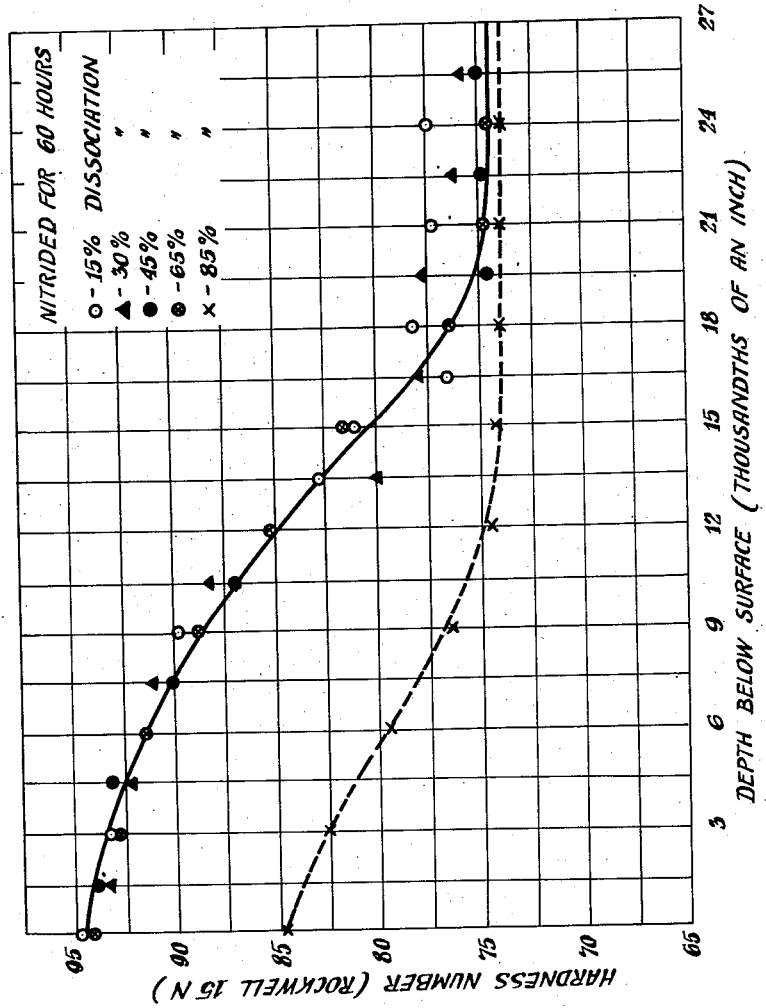
Figure 4:
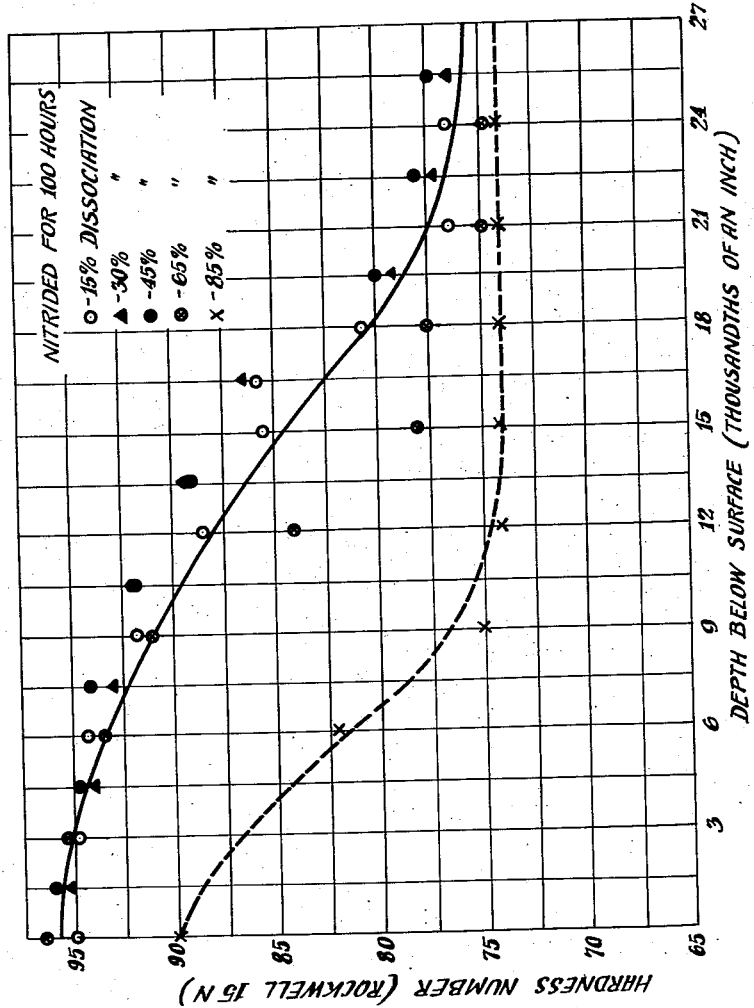
Figure 5:
Figure 6:
Figure 7:
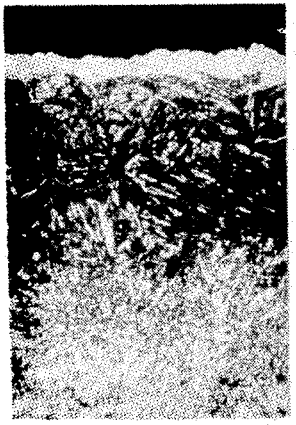
Figure 8:
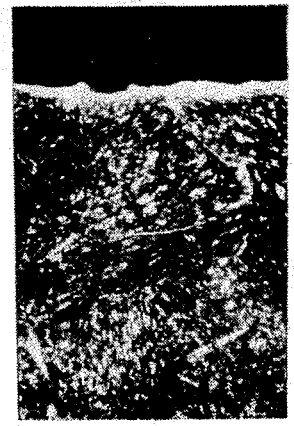

In the drawings:

Figs. 1 to 4 illustrate the effect of various percentages of dissociation from 15% to 85% on depth of case of a set of samples nitrided for 5 hours, 20 hours, 60 hours and 100 hours, respectively;

Figs. 5 to 8 are photomicrographs (500X) illustrating typical case structures produced by nitriding for 5 hours at dissociations of 15%, 30%, 45% and 65%, respectively;

Fig. 9 is a curve illustrating depth hardness characteristics of samples nitrided for 10 hours at 30% dissociation and then for 90 hours at 45%, 65% and 85% dissociations respectively; and Figs. 10 to 12 are photomicrographs (500X) illustrating the case structures of samples nitrided at 30% dissociation for 10 hours and then at 45%, 65% and 85% dissociations, respectively, for 90 hours.

A nitriding temperature of 975° F. was maintained in all of the tests referred to above.

Referring first to Figs. 1 to 4 it will be noted that there is very little difference in depth hardness characteristics for dissociations between 15% and 65% but that at 85% the hardness characteristics are entirely different. The hardness is increased much less at 85% dissociation and for the shorter times is not even increased appreciably. Figs. 5 to 8 illustrate different thicknesses of the white layer when the nitriding is conducted with different dissociations of the ammonia.

Fig. 9 shows that the percentage dissociation of the ammonia during the second period, after a white layer has been formed, makes very slight difference in the case depth characteristics, and Figs. 10 to 12 show the gradual disappearance of the white layer as the rate of dissociation in the second period is increased.

The results hereinbefore described were obtained by nitriding a steel known commercially as "Nitralloy 135" having the following composition:

| | Percent |
|---|---|
| C | 0.34 |
| Mn | 0.55 |
| Si | 0.25 |
| Cr | 1.30 |
| Al | 1.24 |
| Mo | 0.17 |

Depth-hardness specimens, ½ inch square and 4 inches long were machined from ⅞ inch round Nitralloy 135. Before machining, the stock was heat treated by quenching in oil from 1725° F. and tempering at 1250° F. for two hours. Opposite surfaces of the specimens were ground parallel on a surface grinder. After nitriding, the specimens were taper ground to 0.015″ per inch of length in order to make depth-hardness determinations.

The regulation of the percentage dissociation of ammonia within the limits desired at the various stages of the nitriding process may be effected in various ways. One convenient method consists in circulating the ammonia at a relatively rapid rate through the nitriding container during the initial period when the white layer is being formed and thereafter reducing the rate of flow or the supply of fresh ammonia and thereby permitting the percentage of dissociated ammonia to increase, due to the catalytic action of the ferrous metal and other surfaces with which the ammonia comes into contact within the nitriding container. As previously pointed out, the catalytic action of the ferrous surfaces is increased with the formation of the white layer and therefore even though no change in the rate of flow is brought about there will be a substantial increase in the rate of dissociation. In the past it has been considered necessary to counteract this by increasing the rate of flow of the ammonia to maintain the dissociation within low limits, and it is a part of my discovery that this is not necessary after a white layer has been formed so long as the dissociation does not rise to the point where pronounced denitriding will result. Another method of regulating the percentage dissociation of the ammonia so that it will be relatively high in the second stage consists in leading the ammonia through a plurality of nitriding furnaces or containers arranged in series or in suitable parallel and series combinations that will insure that the ferrous metal to be nitrided is subjected for an initial period to ammonia being circulated at a relatively high rate and thereafter the container or furnace will be brought into a circuit wherein the ammonia is circulated at a relatively slow rate, permitting of a higher percentage dissociation to be maintained.

It is to be understood that specific figures as to ammonia dissociation and depths of case have been given by way of illustration and with reference to the particular nitriding temperature employed in the tests described.

The examples of detailed operating procedure hereinbefore outlined were calculated to effect both a marked saving in ammonia and elimination of the white layer. It will be understood, however, that the invention is not to be deemed as limited to operations wherein both of these advantages are realized. Either advantage may be realized without the other and yet the nitriding operation will fall within the spirit and scope of my invention.

It will be understood that the nitriding operation may be carried on at temperatures outside of the preferred range of 925° F. to 975° F. and within the broader range of about 900° F. to 1100° F., in which case the percentage dissociation values demarking the point where no absorption of nitrogen from the ammonia atmosphere will take place on the one hand and the point where objectionable denitriding will begin to take place on the other will vary somewhat from the percentages of about 85% and about 90% specified herein as found to represent these limits when nitriding in an ammonia atmosphere at 975° F. Likewise, if the ammonia atmosphere is diluted with nitrogen or another gaseous substance that is inert in respect of the reactions involved, this will affect somewhat the operating limits for the values of ammonia dissociation. However, in the light of the above disclosures it becomes a relatively simple matter to determine by preliminary tests the precise ammonia dissociation values that need to be maintained when operating under either or both of these changed conditions.

The above indicated and other changes in the details of the procedure may be made without departing from the invention which is not be deemed as limited otherwise than as indicated by the language of the appended claims.

"Batch or discontinuous operation" as used in the appended claims is intended to include those nitriding operations wherein the ferrous articles being nitrided are disposed as a batch or charge in a furnace or other container therefor and remain stationary while the gaseous nitriding medium is circulated about them, and is to be distinguished from an operation wherein a flow of a gaseous nitriding medium is passed continuously either concurrently or countercurrently with the movement of the articles being nitrided through a tunnel or similar continuous type of furnace.

This application is a continuation in part of application Serial No. 509,147, filed November 5, 1943, which has been abandoned.

I claim:

1. The improvement in the nitriding of ferrous metal which comprises treating the metal in a batch or discontinuous operation and while heated to a temperature within the nitride hardening temperature range, with a dry gaseous mixture of ammonia and the dissociation products thereof having an ammonia dissociation value within the range which insures rapid formation on the exposed surfaces of said metal of a nitride layer showing a white appearance when subjected to a nital etch, continuing such treatment with a dry gaseous mixture of ammonia and its dissociation products having an ammonia dissociation value kept solely within the range aforesaid until a thin continuous white layer has been formed, thereupon subjecting the metal to a further nitriding treatment with an ammonia gas mixture containing a relatively high percentage of dissociated ammonia sufficient substantially to arrest any further tendency for formation of said white layer but less than that at which objectionable de-nitriding will take place, and continuing such latter treatment until a case of the desired depth hardness has been produced.

2. The improvement in the nitriding of ferrous metal which comprises treating the metal in a batch or discontinuous operation and while heated to a temperature within the nitride hardening temperature range, with a flow of a dry gaseous mixture of ammonia and the dissociation products thereof having an ammonia dissociation value of less than 65%, continuing such treatment with a dry gaseous mixture of ammonia and its dissociation products having an ammonia dissociation value kept solely below 65% until a thin continuous white nitride layer has been formed on the exposed surfaces of said metal, thereupon subjecting the metal to a further nitriding treatment while controlling the rate of flow of the ammonia gas mixture so as to cause the ammonia dissociation value of said gas mixture to rise to a value of at least 65% but less than that at which de-nitriding will take place, and continuing such latter treatment until a case of the desired depth hardness has been produced.

3. The improvement in the nitriding of ferrous metal which comprises treating the metal, while heated to a temperature within the nitride hardening temperature range, with a dry gaseous mixture of ammonia and the dissociation products thereof having an ammonia dissociation value within the range 15–65%, continuing such treatment with a dry gaseous mixture of ammonia and its dissociation products having an ammonia dissociation value kept solely within the range 15–65% for a period of not exceeding ten hours to form a thin continuous white nitride layer on said ferrous metal and thereupon subjecting the metal to a further nitriding treatment with an ammonia gas mixture having an ammonia dissociation value of at least 65% but less than that at which de-nitriding will take place, and continuing such latter treatment until a case of the desired depth hardness has been produced.

4. The improvement in the nitriding of ferrous metal which comprises treating the metal, while heated to a temperature within the nitride hardening temperature range, with a dry gaseous mixture of ammonia and the dissociation products thereof having an ammonia dissociation value of between 30% and 45%, continuing such treatment with a dry gaseous mixture of ammonia and its dissociation products having an ammonia dissociation value kept solely between 30% and 45% until a thin continuous white nitride layer has been formed on the exposed surfaces of said metal, thereafter subjecting the metal to a further nitriding treatment with an ammonia gas mixture having an ammonia dissociation value within the range 45–85%, and continuing the treatment within such higher dissociation ammonia range until a case of the desired depth hardness has been produced.

5. The improvement in the nitriding of ferrous metal which comprises treating the metal in a batch or discontinuous operation and while heated to a temperature within the nitride hardening temperature range, with a dry gaseous mixture of ammonia and the dissociation products thereof having an ammonia dissociation value kept always below 45% until only a thin continuous white nitride layer has been formed, and thereupon subjecting the metal to a further nitriding treatment with an ammonia gas mixture having a dissociation value of from 65–75% for a period of from 10 to 90 hours.

6. The improvement in the nitriding of ferrous metal which comprises treating the metal in a batch or discontinuous operation and while heated to a temperature within the nitride hardening temperature range, with a dry gaseous mixture of ammonia and the dissociation products thereof having an ammonia dissociation value kept solely below 45% for a period of from 5 to 10 hours to form a thin continuous white nitride layer, thereafter subjecting the metal to a further nitriding treatment with an ammonia gas mixture having a dissociation value of from 65–75% for a period of from 10 to 90 hours, and finally subjecting said metal to a nitriding treatment with an ammonia gas mixture having a dissociation value of at least 85% for a sufficient time to substantially completely remove the white layer initially formed on said metal.

7. The improvement in the nitriding of ferrous metal which comprises treating the metal in a batch or discontinuous operation and while heated to a temperature within the nitride hardening temperature range, with a dry gaseous mixture of ammonia and the dissociation products thereof having an ammonia dissociation value within the range which insures rapid formation on the exposed surfaces of said metal of a nitride layer showing a white appearance when subjected to a nital etch, continuing such treatment with a dry gaseous mixture of ammonia and its dissociation products having an ammonia dissociation value kept always within the range aforesaid until only a thin continuous white layer has been formed, thereafter subjecting the metal to a further nitriding treatment with an ammonia gas mixture containing a relatively high percentage of dissociated ammonia within the range in which there is a substantially lessened tendency for formation of white layer but below that dissociation at which objectionable denitriding will take place, and continuing such latter treatment until a case of the desired depth hardness has been produced.

8. The improvement in the nitriding of ferrous metal which comprises treating the metal, while heated to a temperature within the nitride hardening temperature range, with a flow of a dry gaseous mixture of ammonia and the dissociation products thereof having an ammonia dissociation value within the range which insures rapid formation on the exposed surfaces of said metal of a nitride layer showing a white appearance when subjected to a nital etch, continuing such treatment with a dry gaseous mixture of ammonia and the dissociation products thereof having an ammonia dissociation value kept always within the range aforesaid until only a thin continuous white layer has been formed, thereafter decreasing the rate of flow of the ammonia gas mixture and permitting the ammonia dissociation value of the ammonia gas mixture to rise to a value within the range in which there is a substantially lessened tendency for formation of white layer but below that dissociation at which objectionable denitriding will take place and continuing the nitriding treatment with such decreased flow of ammonia until a case of the desired depth hardness has been produced.

9. The improvement in the nitriding of ferrous metal which comprises treating the metal, in a batch or discontinuous operation and while heated to a temperature within the nitride hardening temperature range, with a dry gaseous mixture of ammonia and the dissociation products thereof having an ammonia dissociation value within the range which insures formation on the exposed surfaces of said metal of a nitride layer showing a white appearance when subjected to a nital etch, continuing such treatment with a dry gaseous mixture of ammonia and its dissociation products having an ammonia dissociation value within the range aforesaid until a continuous white layer has been formed, thereafter subjecting the metal to a further nitriding treatment with an ammonia gas mixture containing a relatively high percentage of dissociated ammonia within the range in which there is a substantially lessened tendency for formation of said white layer but below that dissociation at which objectionable denitriding will take place, continuing such latter treatment until a case of the desired depth hardness has been produced, and, in the final stages of said latter treatment, maintaining the ammonia dissociation value of said ammonia gas mixture sufficiently high to produce gradual elimination of said white layer.

10. The improvement in the nitriding of ferrous metal which comprises treating the metal, in a batch or discontinuous operation and while heated to a temperature within the nitride hardening temperature range, with a dry gaseous mixture of ammonia and the dissociation products thereof having an ammonia dissociation value within the range which insures formation on the exposed surfaces of said metal of a nitride layer showing a white appearance when subjected to a nital etch, continuing such treatment with a dry gaseous mixture of ammonia and its dissociation products having an ammonia dissociaton value within the range aforesaid until a continuous white layer has been formed, thereafter subjecting the metal to a further nitriding treatment with an ammonia gas mixture containing a relatively high percentage of dissociated ammonia within the range in which there is a substantially lessened tendency for formation of white layer but below that dissociation at which objectionable denitriding will take place, continuing such latter treatment until sufficient nitrogen has been absorbed by the metal to insure the desired ultimate depth of case, and thereafter continuing heating of said metal within the nitride hardening temperature range in the presence of a dry gaseous atmosphere of ammonia and the dissociation products thereof containing insufficient undissociated ammonia to produce further nitriding while at the same time keeping the ammonia dissociation value below the point where substantial denitriding will take place and continuing such treatment until the excess nitrogen of the white layer has been diffused into the inner portions of the case.

11. The improvement in the nitriding of ferrous metal which comprises treating the metal, in a batch or discontinuous operation and while heated to a temperature within the nitride hardening temperature range, with a dry gaseous mixture of ammonia and the dissociation products thereof having an ammonia dissociation value of less than 65%, continuing such treatment with a dry gaseous mixture of ammonia and its dissociation products within the range aforesaid until a continuous white nitride layer has been formed on the exposed surfaces of the metal, thereafter subjecting the metal to a further nitriding treatment with an ammonia gas mixture having a dissociation value within the range 65–85% and continuing such further treatment until sufficient nitrogen has been absorbed by the metal to insure the desired ultimate depth of case, and thereafter heating said metal within the nitride hardening temperature range in the presence of an ammonia gas mixture having a dissociation value of at least 85% but less than that at which objectionable denitriding will take place, and continuing such final treatment until the excess nitrogen of the white layer has been diffused into the inner portions of the case.

CARL F. FLOE.

REFERENCES CITED

The following references are of record in the file of this patent:

Automotive Industry, Aug. 29, 1931, pages 314–318.